United States Patent [19]

May

[11] Patent Number: 5,471,040
[45] Date of Patent: Nov. 28, 1995

[54] CAPACITIVE DATA CARD SYSTEM

[76] Inventor: George May, 5852 East Sooke Road, Sooke, B.C. Y0S 1N0, Canada

[21] Appl. No.: 148,611

[22] Filed: Nov. 15, 1993

[51] Int. Cl.$^6$ ..................................................... G06K 7/08
[52] U.S. Cl. ............................ 235/451; 235/492; 365/96
[58] Field of Search .................................. 235/451, 492; 365/96

[56] References Cited

U.S. PATENT DOCUMENTS

| | | | |
|---|---|---|---|
| 2,688,739 | 9/1954 | Hofgaard | 365/96 |
| 3,091,754 | 5/1963 | Nazare | 365/96 |
| 3,146,425 | 8/1964 | Benn et al. | 365/96 |
| 3,404,382 | 10/1968 | Rosenheck et al. | 235/451 |
| 3,582,908 | 6/1971 | Koo | 365/96 |
| 3,699,311 | 10/1972 | Dunbar | 235/61.11 H |
| 3,719,804 | 3/1973 | Illing | 235/451 |
| 3,869,082 | 3/1975 | Ludin | 235/451 |
| 4,017,834 | 4/1977 | May | 235/451 |
| 4,280,119 | 7/1981 | May | 235/382 |
| 5,159,181 | 10/1992 | Bartels et al. | 235/441 |
| 5,218,189 | 6/1993 | Hutchison | 235/439 |
| 5,371,346 | 12/1994 | Menoud | 235/492 |

FOREIGN PATENT DOCUMENTS

| | | | |
|---|---|---|---|
| 0422482A2 | 10/1990 | European Pat. Off. | G06K 1/12 |
| 2812388 | 3/1978 | Germany | G11B 9/06 |
| 4009512C1 | 3/1990 | Germany | G06K 19/067 |
| 57-111885 | 7/1982 | Japan | 365/96 |
| 84/00075 | 1/1984 | WIPO | 365/96 |

OTHER PUBLICATIONS

International Search Report for International Application No. PCT/IB 94/00396, dated Mar. 7, 1995, mailed Mar. 29, 1995, pp. 1–3.

*Primary Examiner*—Donald Hajec
*Assistant Examiner*—Jeffrey R. Filipek
*Attorney, Agent, or Firm*—Limbach & Limbach; Michael A. Stallman

[57] ABSTRACT

A data storage and retrieval system is disclosed which includes an interface module and a data card. Both the interface module and card include a plurality of primary and secondary electrodes having the same pattern. The data card further includes a plurality of fuses extending between each of the primary and secondary electrodes. When the fuse is intact, it will conduct current. When the fuse is blown, the resistance will substantially increase. The state of the resistance of the fuse is used to represent bits of data. In operation, the card is juxtaposed with respect to the interface module so that the respective electrodes can be capacitively coupled. In order to read the data on the card, a an output having a predetermined voltage and frequency is applied to the electrodes. The level of AC current passing through the fuse is measured and the result is used to derive the state of the fuse. When information is to be written onto the card, the voltage level and the oscillating frequency are increased causing the current flow in the electrodes to increase thereby blowing the fuse. The hardware is low in cost, requires low power to operate and provides a write once/read many memory (WORM) in the form of a disposable data card.

33 Claims, 9 Drawing Sheets

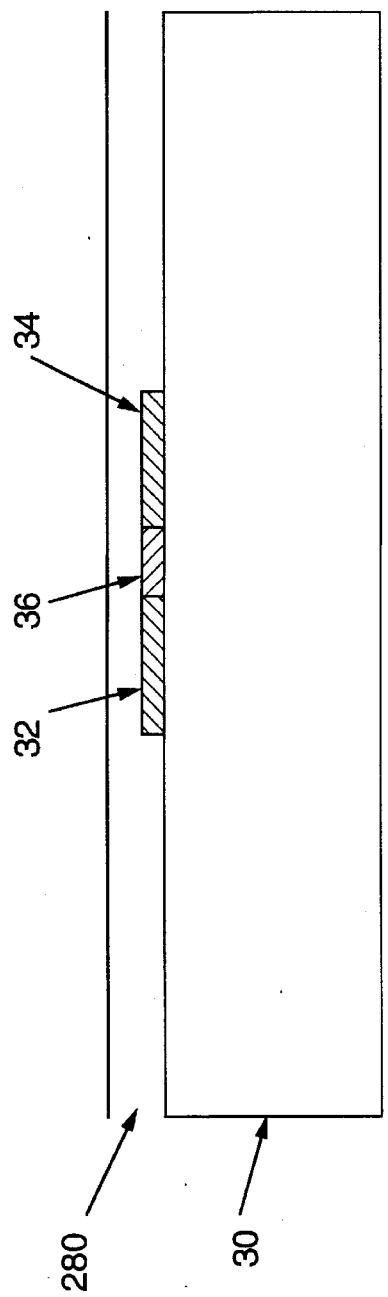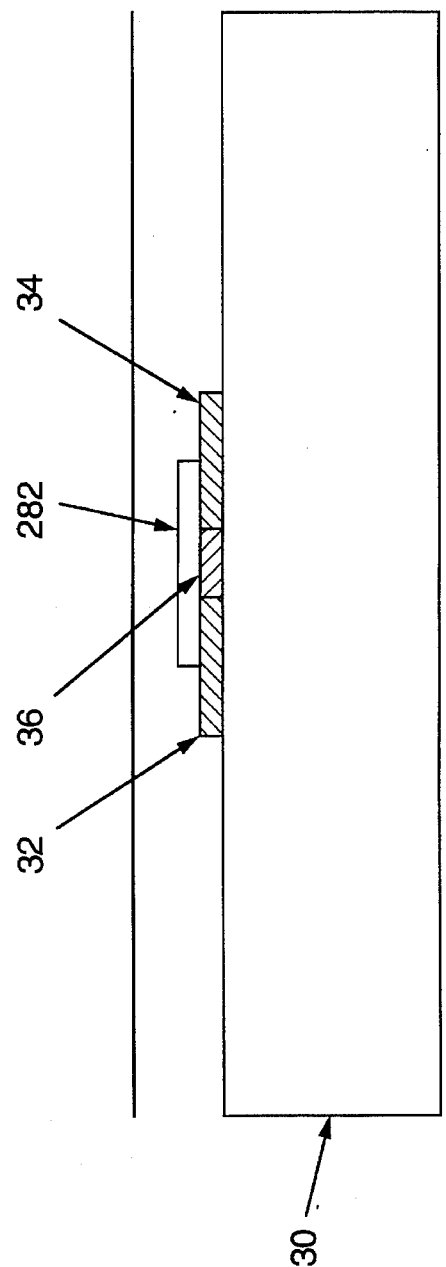

CAPACITIVE DATA CARD SYSTEM

TECHNICAL FIELD

The subject invention relates to a data storage and retrieval system which includes a low cost data card that can be read and/or changed using a capacitively coupled interface.

BACKGROUND OF THE INVENTION

There has been significant interest in developing low cost data cards which can be used as a substitute for cash and coins. In many applications such as pay phones, parking meters, vending machines and public transportation, it is convenient to use a data card instead of change for payment. In addition, devices which accept a card are less likely to be vandalized since they do not hold any cash.

To date, the most common form of data card used for this purpose stores information on a magnetic stripe. Information about the value purchased by the consumer can be written onto the stripe. As the card is used in various applications, the data on the card can be updated to reflect the amount which must be debited for the transaction. Thus, these magnetic stripe cards have the attribute that information can be stored and thereafter changed as the monetary value is depleted. The magnetic stripe cards themselves are relatively low in cost to manufacture and are considered disposable.

Magnetic stripe value cards systems do have certain drawbacks. First, the magnetic stripe reader/writers tend to be relatively high in cost and have moving parts. In addition, magnetic stripe reader/writers require significant electrical power to operate and therefore cannot be stand alone devices. Another problem is that the magnetic stripe card does not provide any visual indication of the monetary value left on the card. Finally, the information on a magnetic stripe card can be accidentally erased by stray magnetic fields or could be copied leading to fraud problems.

All of the above drawbacks are overcome with the capacitive data card system of the subject invention. A capacitive-type data card system was previously described by the inventor herein in U.S. Pat. No. 4,280,119 issued Jul. 21, 1981, incorporated herein by reference. In the system described in this patent, the reader included an array of individually addressable primary electrodes and a common secondary electrode ($E_{ref}$). A planar data card was provided that included a conductive layer. The data card was "programmed" by including a pattern of holes in the conductive layer which would be in register with the selected primary electrodes of the reader when the card was in place.

In operation, a voltage was selectively applied between the individual primary electrodes and the common secondary electrode of the reader. The conductive body of the data card would be capacitively coupled to the reference ground plane. The capacitance between any particular primary electrode and the secondary electrode ($E_{ref}$) would be less if a hole in the card was present at that spatial location of the primary electrode than if the area on the card were conductive. By measuring the detected capacitance adjacent each primary electrode of the reader, the data could be read.

The above described capacitively coupled card system was particularly useful in applications where the data on the card need not be changed. For example, the prior data cards could be used as keys. The cards could be low cost, disposable and the "combination" could be kept hidden. As will be discussed below, the concepts initially disclosed in the U.S. Pat. No. 4,280,119 have now been expanded and enhanced to provide a card where the data can be changed and wherein a visual indication can be provided as to the status of the data on the card.

Accordingly, it is an object of the subject invention to provide a new and improved data storage and retrieval system.

It is a further object of the subject invention to provide a new and improved data storage and retrieval system which is simple and can be manufactured at low cost.

It is another object of the subject invention to provide a new and improved data storage and retrieval system where information on the data card can be read and changed.

It is still a further object of the subject invention to provide a new and improved data storage and retrieval system which has no moving parts.

It is still another object of the subject invention to provide and new and improved data storage system which can operate as a stand alone device with a low power battery source.

It is still another object of the subject invention to provide a new and improved data storage and retrieval system wherein the data bits in one embodiment can be written only once but read many times thereby limiting fraud.

It is still a further object of the subject invention to provide a data card where the data bits in another embodiment can be written and read multiple times.

It is still another object of the subject invention to provide a data card which includes a visual indication of the monetary value remaining on the card.

SUMMARY OF THE INVENTION

In accordance with the above recited objects, the subject invention includes an interface module which functions to both read the data on the card and to change the data on the card. The interface module includes a plurality of individually addressable primary interface electrodes preferably arranged in a number of parallel rows. A plurality of individually addressable, elongated common secondary electrodes are also provided. In the preferred embodiment, one elongated secondary electrode is positioned between each row of primary electrodes. The interface module further includes a means for generating a low voltage output signal which is applied to the electrodes. An analog switching network is provided to selectively energize each primary electrode and the associated secondary electrode when a data card is in place.

The subject invention further includes a low cost, disposable data card. The data card includes a plurality of primary and secondary card electrodes. The pattern of electrodes on the card is the same as the pattern of the electrodes in the interface module and are intended to be positioned in register with the electrodes of the interface module when the card is presented for reading or writing. Unlike the electrode structure in the interface module, the card further includes a plurality of bridges, each bridge extending between a primary electrode and the associated secondary electrode. This bridge has a resistance which can be either high or low. The state of the resistance of the bridge is representative of a bit of information. The resistance of the bridge can be changed from one state to the other by the interface module.

In one preferred embodiment, the bridge is in the form of a conductive fuse. When the card is to be read, a voltage is supplied to the selected interface electrodes. This voltage is capacitively coupled into the card. If the fuse is present, the current passing through the card will be higher than if the fuse is blown. The interface module includes a detector which measures the level of current passing through the circuit. The output of the detector is used to determine the state of the fuse.

In order to change the state of the fuse (i.e. blow the fuse), the input power applied to the electrodes is increased. The simplest method of increasing the output is to increase the voltage to a level sufficient to blow the fuse. In the preferred embodiment, an RF voltage output is used. In this case, the current passing through the circuit can also be increased by increasing the frequency of the output. Thus, the fuse can be blown by increasing either the voltage or the frequency of the output or through a combination of both.

In another embodiment, the bridge takes the form of an "antifuse." In this case, the bridge can be defined by a layered sandwich where a dielectric layer is disposed between two conductive metallic layers. This structure has a relatively high resistance. When a sufficiently high current is applied across the antifuse, the dielectric layer will breakdown, thereby lowering the resistance in the antifuse.

The above described embodiments which use a fuse provide for a write once/read many (WORM) memory. It is also possible to provide a memory card with multiple read and write capability. In this case, the bridge can be formed from a material, such as a semiconductor glass, which has the property of having a resistance which is dependent upon the rate of cooling which takes place after the material has been heated. By controlling the profile of the writing pulse, the resistance of the bridge can be set to the desired level.

The subject system further includes the capability of providing a visual indication of the bit status on the card. In the preferred embodiment, a material which changes color in the presence of elevated temperatures is associated with the fuse. When a voltage is applied to blow the fuse, the region around the fuse will be heated, thereby causing a color change in the indicator material. By this arrangement, the user can observe and determine which fuses have been blown. In a value card, each blown fuse can represent the depletion of a certain value of currency. When all of the fuses are blown, the card would no longer have any value and could be discarded.

Further objects and advantages will become apparent from the following detailed description taken in conjunction with the following drawings in which:

BRIEF DESCRIPTION OF THE DRAWINGS

FIG. 11 is cross-sectional view of the data card illustrating one approach for allowing the state of the bridge to be visually observed.

FIG. 12 is cross-sectional view of the data card illustrating another approach for allowing the state of the bridge to be visually observed.

DETAILED DESCRIPTION OF THE PREFERRED EMBODIMENT

Figure 1:
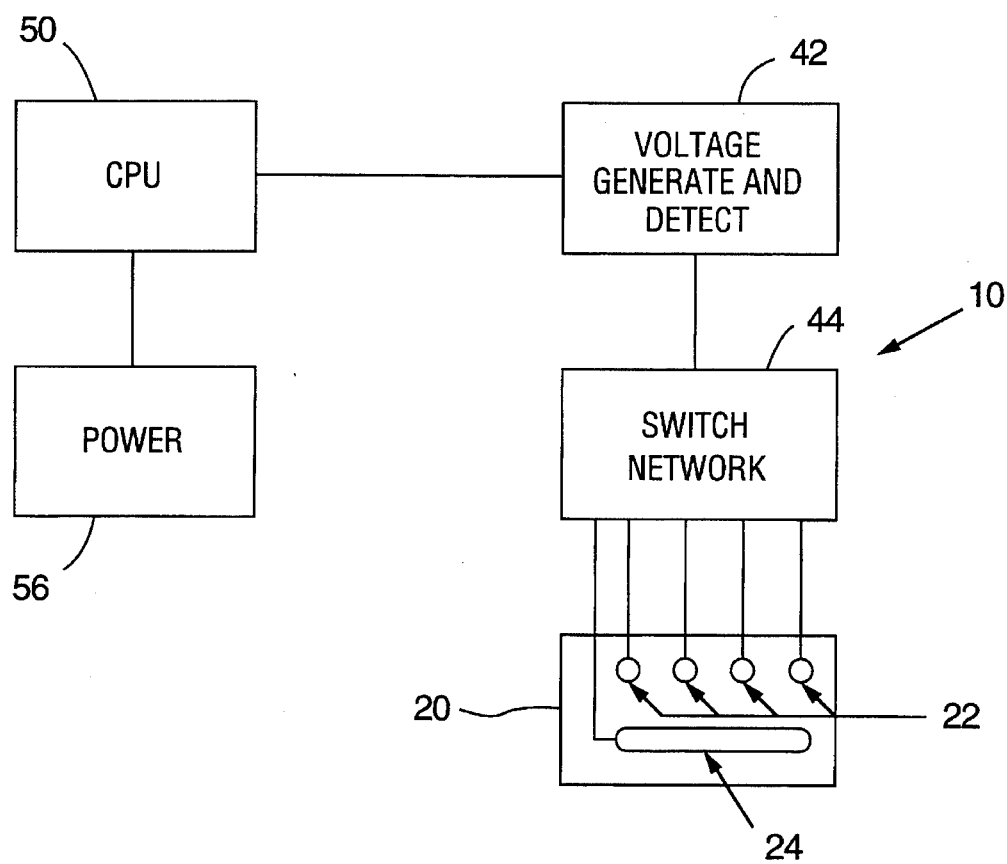
FIG. 1 is a block diagram of the reader/writer interface module of the subject invention.
Figure 2:
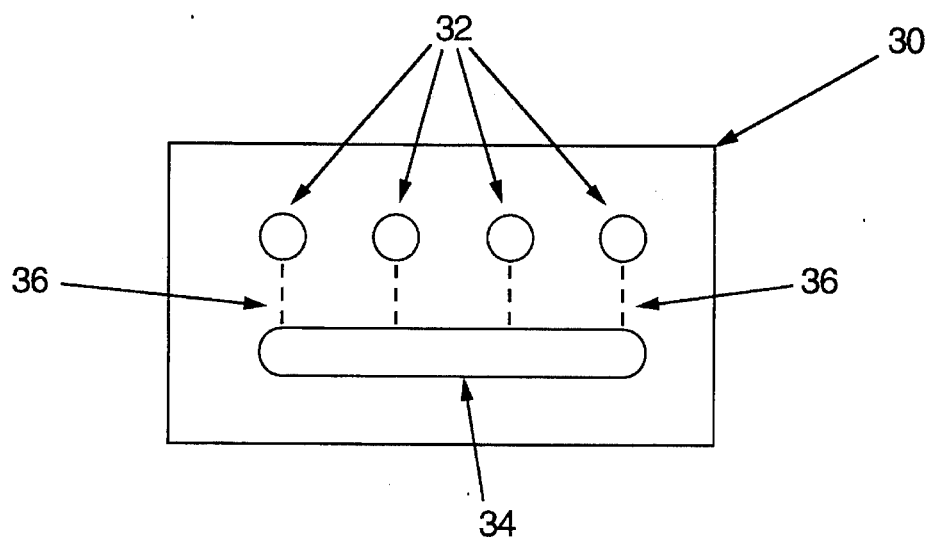
FIG. 2 is a block diagram of a data card formed in accordance with the subject invention.

FIGS. 1 and 2 illustrate the basic data storage and retrieval system of the subject invention. FIG. 1 illustrates the reader/writer or interface module designated generally by the numeral 10. Module 10 includes an interface pad 20 having a pattern of addressable electrodes. As shown in FIG. 1, pad 20 includes a plurality of individual primary electrodes 22 aligned in a row. An elongated, common secondary electrode 24 is disposed adjacent to the row of primary electrodes 22.

The data card 30 of the subject invention is illustrated in FIG. 2. Data card 30 includes an electrode pattern which matches the electrode pattern on pad 20 of module 10. More specifically and as shown in FIG. 2, card 30 includes a row of primary card electrodes 32 and an elongated, common, secondary electrode 34. It should be understood that various other electrode patterns may be used in carrying out the objects of the subject invention. However, it is important that the electrode patterns of pad 20 and card 30 match so that when the card is juxtaposed with respect to the pad, the electrodes will be aligned and in register so that current can be capacitively coupled therebetween.

Although the electrode patterns on the pad and card match, card 30 is further provided with a means for connecting the primary electrodes to the secondary electrode. As illustrated in FIG. 2, the connecting means is in the form of a bridge 36. The level of resistance of this bridge can be used to represent data. In the preferred embodiment, the bridge is defined by a conductive fuse. When the fuse is intact, the bridge will have a very low resistance allowing current to pass freely between the primary and secondary electrodes. If however, the fuse is blown, the resistance will dramatically increase substantially reducing current flow. By measuring the current flow between the electrodes, the state of the fuse (and the data it represents) can be determined.

Interface module 10 includes the circuits necessary to read the resistance of a selected bridge 36 and also to change the resistance of a selected bridge. To achieve this goal, module 10 includes means 42 for generating and detecting voltages. As discussed below, in the preferred embodiment, an RF generator is used. The output of the generator 42 is supplied to an analog switching network 44 for applying the output voltage to the electrodes in pad 20. A more detailed description of the preferred embodiments of the switching network 44 and the generator 42 will be provided below with reference to FIGS. 9 and 10 respectively.

The interface module is controlled by a CPU 50. CPU 50 can be defined by a microprocessor. The system is powered by a power supply 52. Supply 52 operates both the CPU and supplies the power for reading and writing on the card.

When a card is juxtaposed with respect to pad 20, the CPU 50 will initiate a sequence wherein the resistance of each of the bridges 36 is read to determine the bits of information associated with each of the primary card electrodes 32. To achieve this goal, the CPU will enable generator 42 and sequentially gate the output to each of the primary electrodes in pad 20 through the control of switching network 44.

Figure 3:
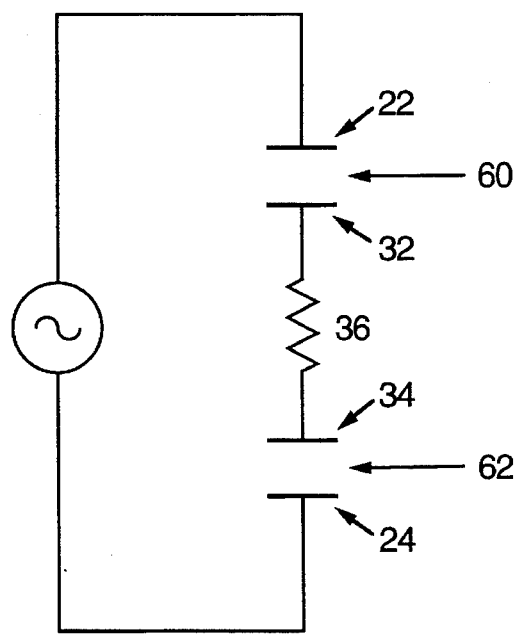
FIG. 3 is a diagram of the equivalent circuit which is formed when an output is supplied to the electrodes of the interface module and the data card.

FIG. 3 illustrate the circuit created during the energizing step. More specifically, the primary electrode 22 of pad 20 of module 10 becomes the top plate of capacitor 60. The bottom plate of capacitor 60 is defined by the primary electrode 32 of the card 30. Bridge 36 acts as a resistor between a second effective capacitor 62. The top plate of the second capacitor 62 is defined by the secondary electrode 34 of the card 30 while the bottom plate of the capacitor 62 is defined by the secondary electrode 24 in pad 20.

When a high frequency AC voltage is applied to the circuit shown in FIG. 3, the AC current (I) which flows therethrough is defined by the following formula:

$$I=V/[(1/j\omega C_{60})+(R_{36})+(1/j\omega C_{62})] \qquad (1)$$

where V is the voltage and the $(1/j\omega C)$ terms are the respective impedances of the two capacitors (with j being the square root of $-1$; $\omega$ being the angular frequency of the voltage and C being the capacitance of the capacitors described above).

As noted above, in the preferred embodiment, the bridge 36 will either be conductive or blown, presenting one of two dramatically different levels of resistance. Thus, if a known voltage is applied to the electrodes and the current is measured, the resistance of the bridge can be determined and the state of the bridge (conductive or blown) can be derived.

Figure 4:
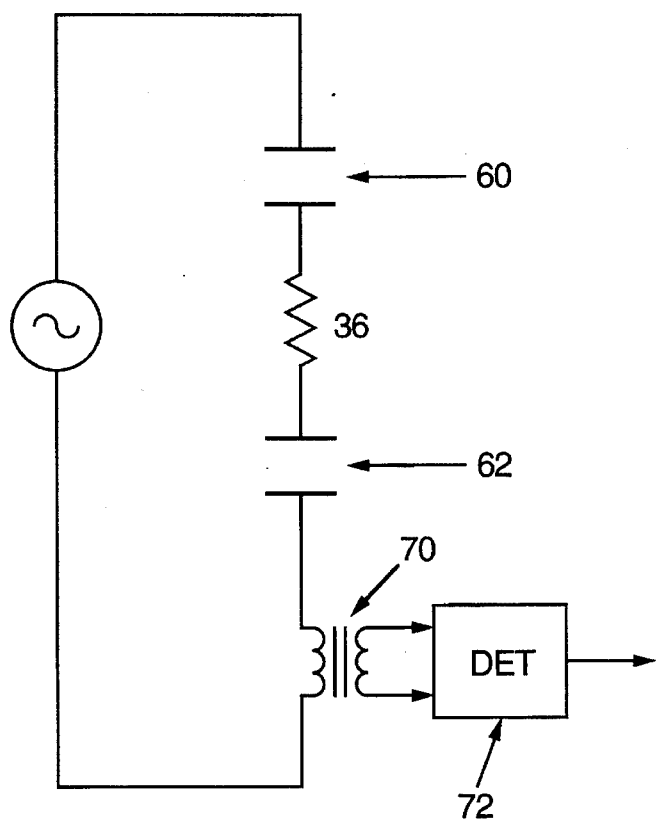
FIG. 4 is a diagram of the circuit which would be used to sense the state of the resistance of the bridge on the data card.

FIG. 4 illustrates a circuit for determining the current passing through the circuit of FIG. 3. As shown therein, an inductive coupling 70 is used to generate a current flow in detection circuit 72. The voltage in the detection circuit 72 is proportional to the current in the circuit of FIG. 3. By measuring the voltage in the detection circuit 72, the state of the bridge can be determined.

Figure 5:
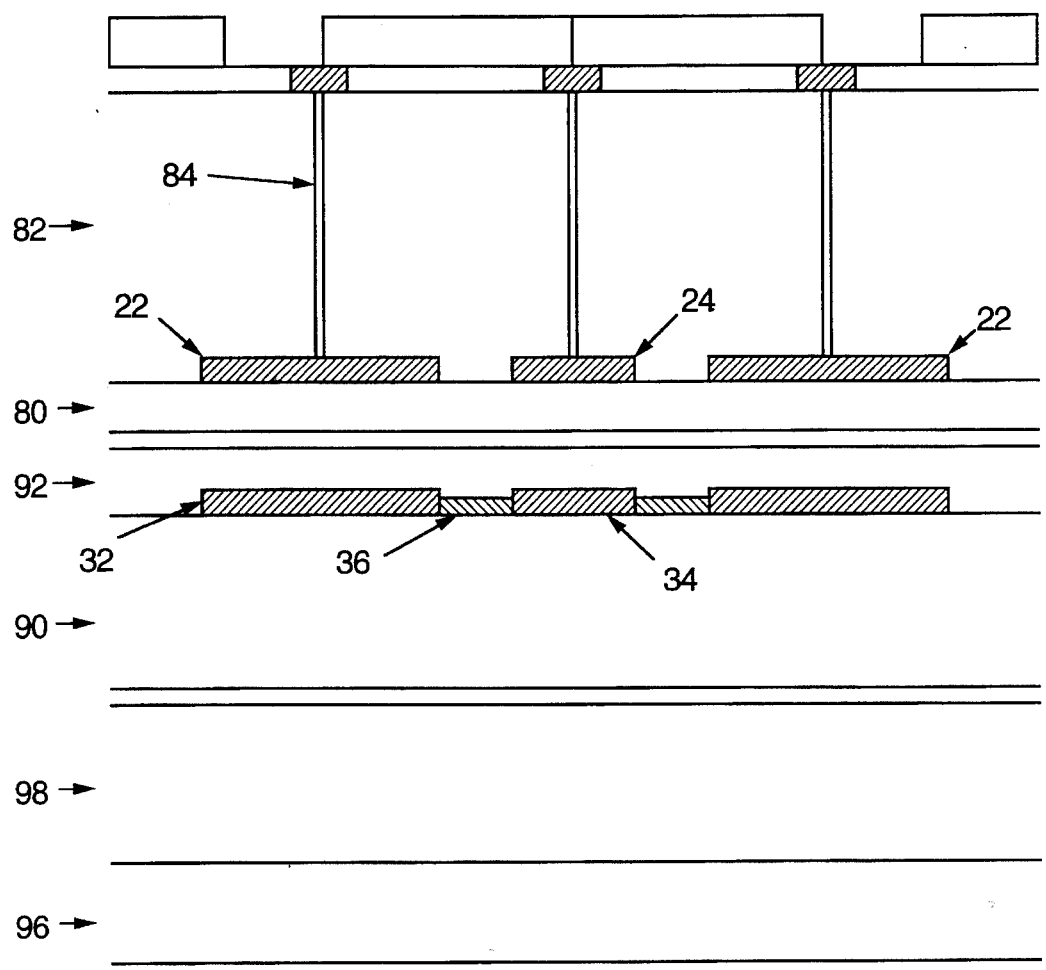
FIG. 5 is a cross-sectional view showing the juxtaposition of the electrodes of the interface module and the data card in the preferred form of the subject invention.

FIG. 5 illustrates the preferred form of card 30 juxtaposed against the pad 20 of module 10. As can be seen, the pad 20 can include an outer surface 80 formed from a smooth, scratch resistant material with a high dielectric constant. The electrodes 22 and 24 are formed in a ceramic substrate 82. Feed through leads 84 are used to connect the electrodes to the internal electronics.

The electrodes on card 30 are formed on a plastic substrate 90. A thin, flexible, scratch resistance coating 92 is provided over the electrodes. The system should also include a means for providing intimate, close contact between the pad 20 and the card 30. As illustrated in FIG. 5, an elastic, close celled foam layer 96 is used to bias a smooth, low friction push plate 98 and force the card and pad into a close relationship. This approach eliminates the need for any moving parts. It is desirable that some sensing system be provided to determine when the card has been properly located with respect to the pad and reading can be begun.

The approach for reading and writing individual bits on the card is identical except for the profile of the output generated and supplied to the electrodes. When it is desired to change the resistance of the bridge (by blowing the fuse) and thereby changing the data bit from a "one" to a "zero", a higher current level must be driven through the bridge. In the preferred embodiment, this result is achieved by increasing both the voltage and the frequency of the output. As can be seen from equation (1), increasing both of the these variables will increase the current through the circuit. The amount of increase necessary will depend upon the type of fuse used.

Figure 6:
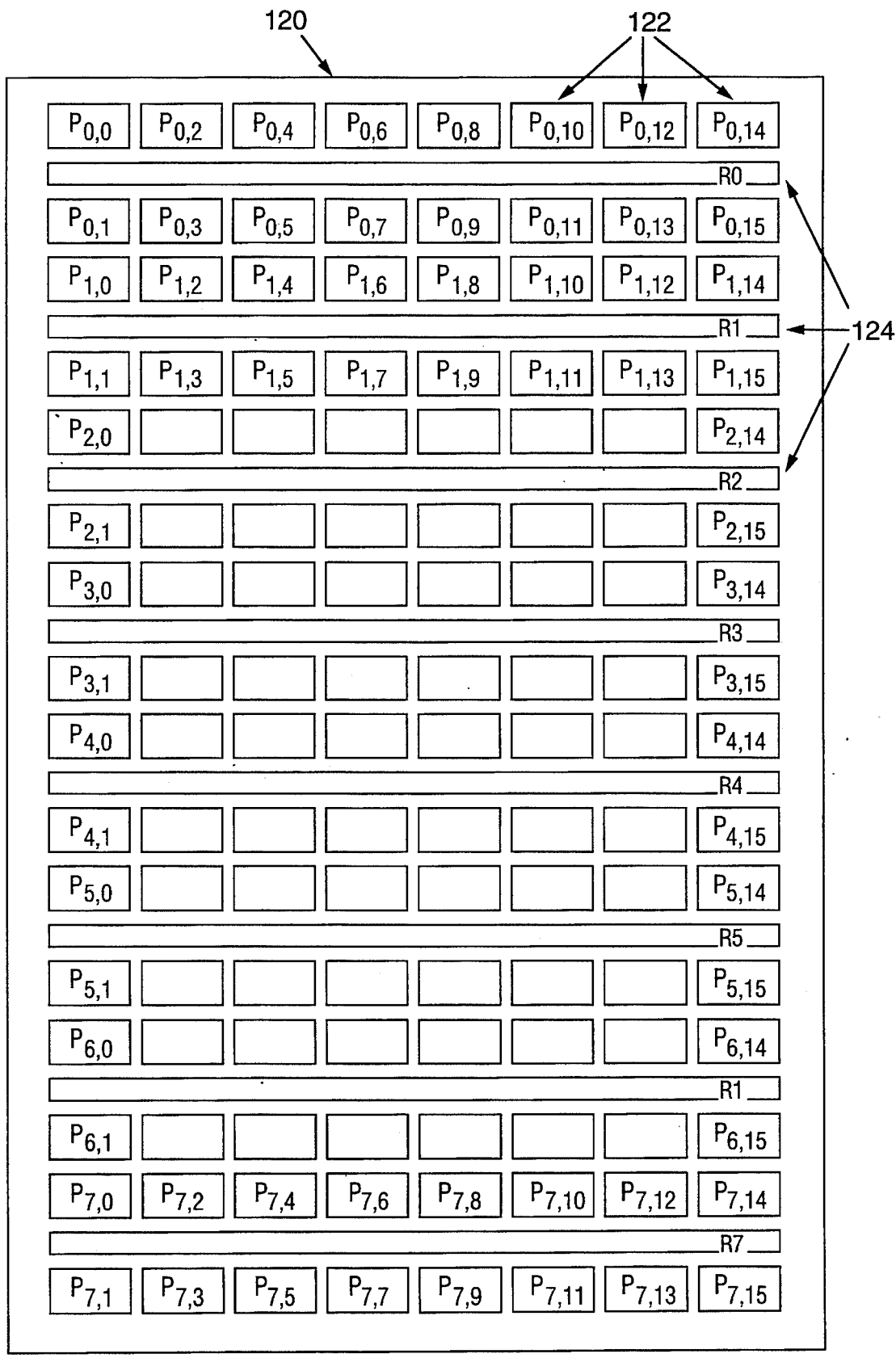
FIG. 6 is a planar view of the preferred form of the electrode structure of the subject interface module.

FIGS. 6 to 10 illustrate one preferred form of the subject invention. FIG. 6 illustrates the form of the pad 120 having a series of primary and secondary electrodes 122 and 124. In this lay out, there are eight, individually addressable elongated secondary electrodes ($R_0$–$R_7$) arranged in parallel. On either side of each secondary electrode is a row consisting of eight, individually addressable, primary electrodes ($P_0$–$P_{15}$) having a flat, rectangular configuration. Since there are two rows of primary electrodes for each of the eight secondary electrodes, it can be seen that there are a total of sixteen rows of primary electrodes, each having eight elements for a potential of 128 bits of data.

Figure 7:
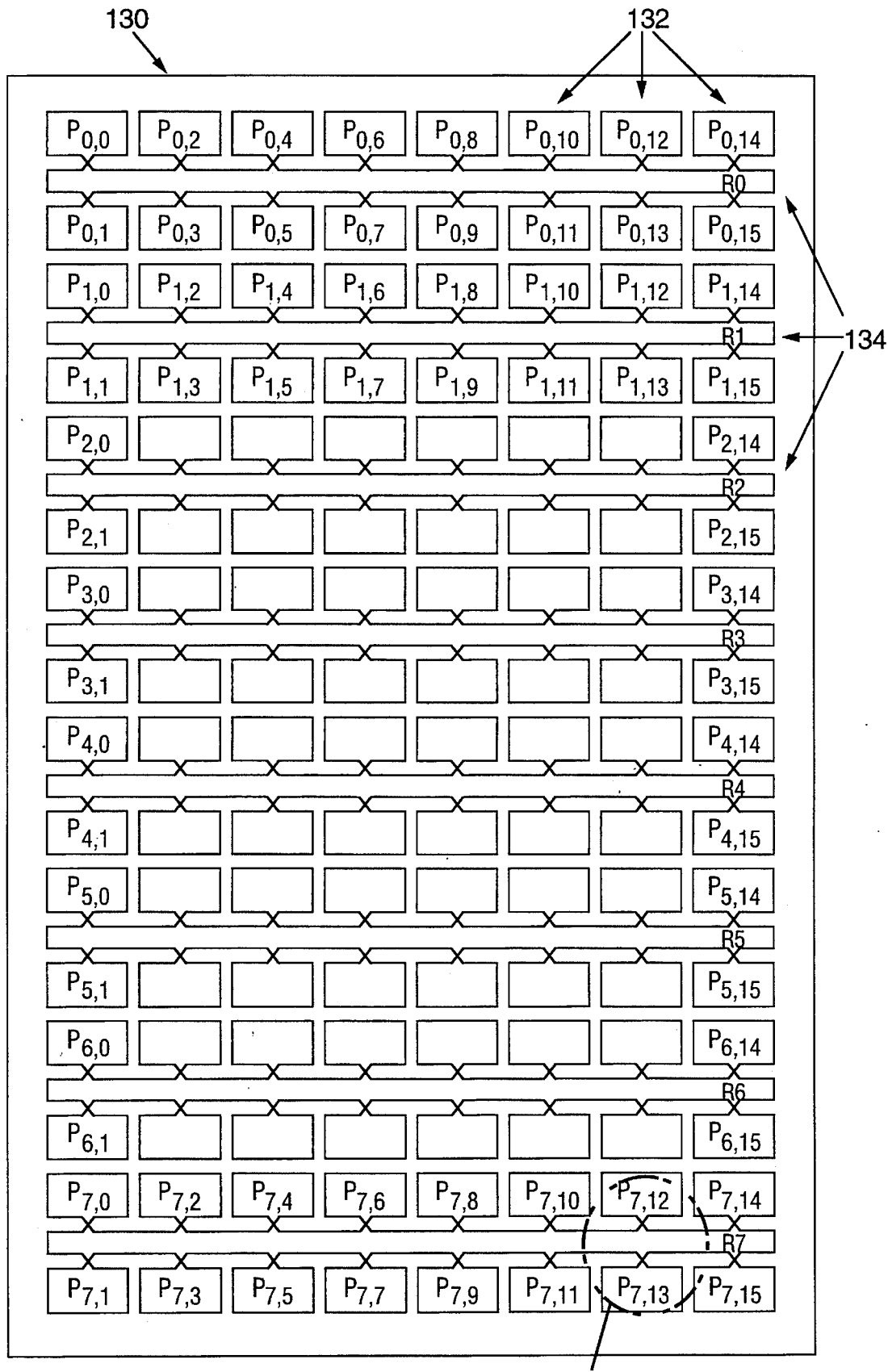
FIG. 7 is a planar view of the preferred form of the electrode structure of the subject data card.
Figure 8:
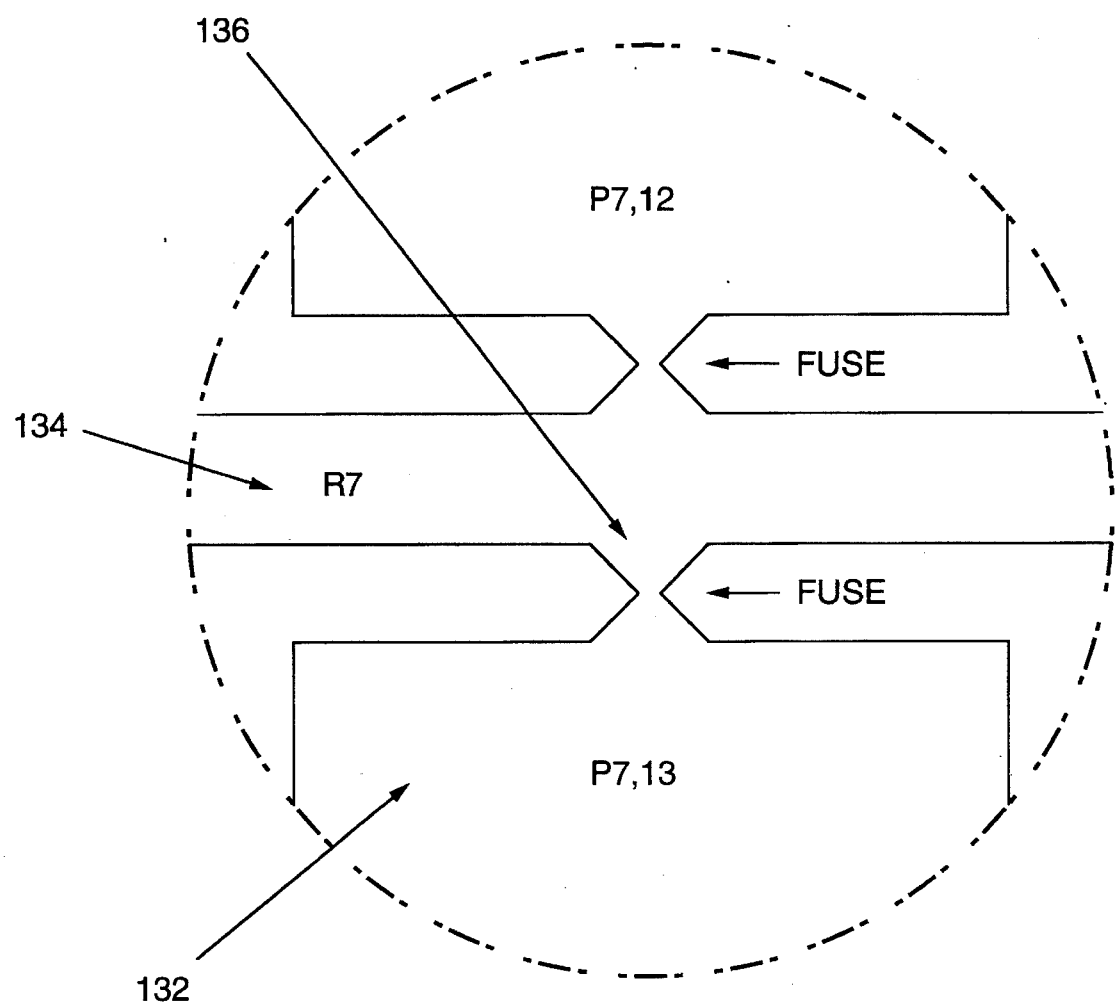
FIG. 8 is an enlarged view of a fuse defining a bridge on the data card of the subject invention.

FIG. 7 illustrates the pattern of electrodes on an exemplary card 130. Like the pad 120, card 130 includes eight secondary electrodes 134 ($R_0$–$R_7$) and sixteen rows of primary electrodes 132 with each row of primary electrodes including eight individual elements. In addition, and as better seen in FIG. 8, a bridge or fuse 136 is provided between each primary electrode and the associated secondary electrode. The electrode and bridge structure can be formed by vapor coating a metal film on the substrate. The fuses can be formed using a narrowed region of the deposited metal.

Figure 9:
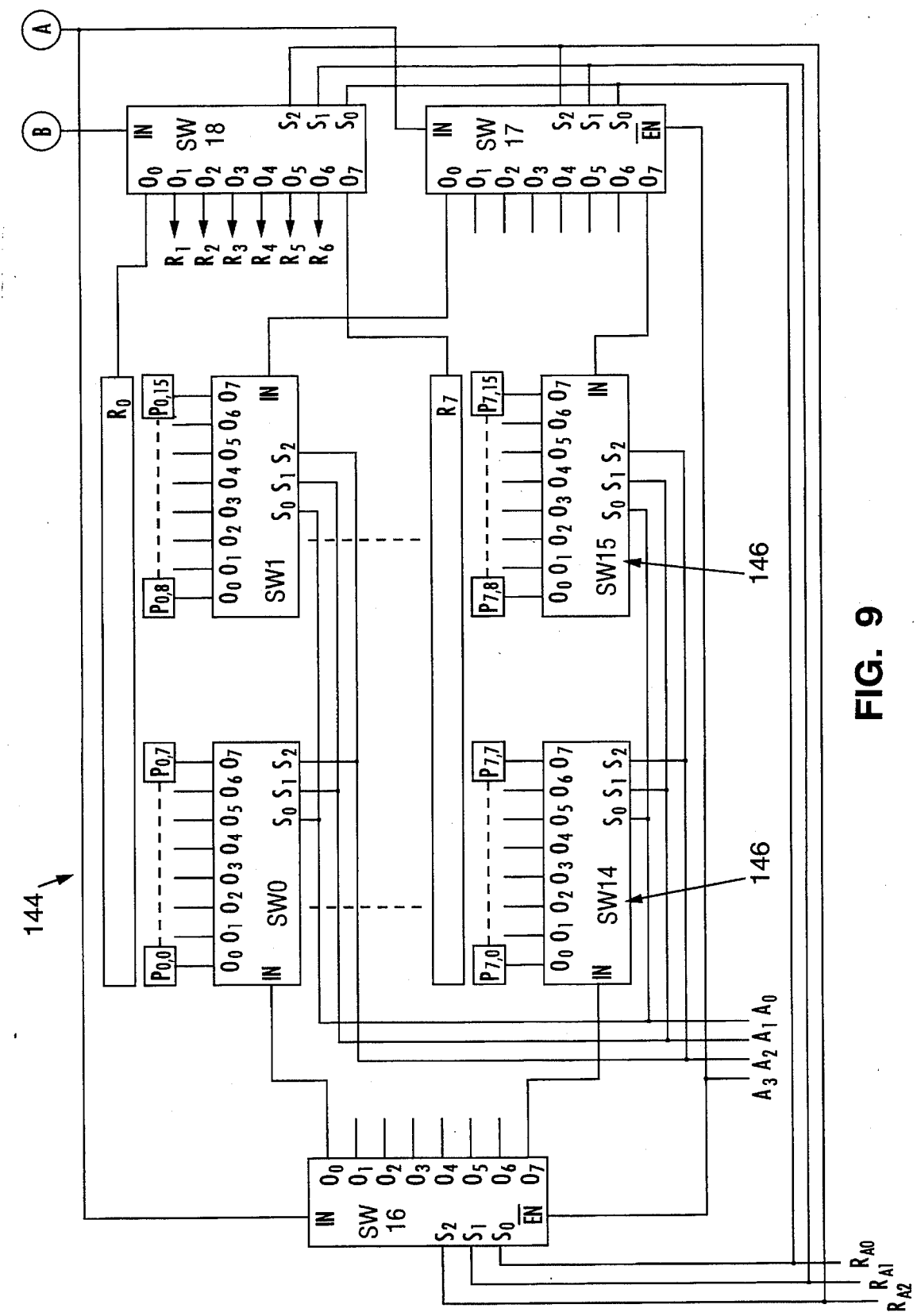
FIG. 9 is a block diagram of the analog switches which could be used to address the electrodes of the subject invention.

FIG. 9 illustrates an example of a switching network 144 which could be used to individually address the electrodes in pad 120. Network 144 includes a plurality of eight to one analog switches 146. Each switch can receive an input and distribute that input to one of eight outputs. Three control lines are provided to each switch 146 to select the appropriate output.

In the layout shown in FIG. 9, the RF output is supplied to pins A and B. The input from pin B is gated to switch labeled $SW_{18}$. The output from $SW_{18}$ is supplied to one of the eight secondary electrodes shown as $R_0$ to $R_7$. The selection of the particular row is made by the CPU 50 and supplied along address lines $R_{A0}$, $R_{A1}$ and $R_{A2}$.

The input from pin A is supplied to switches $SW_{16}$ and $SW_{17}$. Switches $SW_{16}$ and $SW_{17}$ select which row of primary electrodes is to be connected. As noted above, there are sixteen rows of primary electrodes. Eight of those rows are connectable via switch $SW_{16}$ while the remaining eight rows are connectable via $SW_{17}$. Since the rows of primary electrodes correspond to the secondary electrodes, the same control ($R_{A0}$, $R_{A1}$ and $R_2$) are used to select the row of primary electrodes. Control line $A_3$ controls which switch ($SW_{16}$ or $SW_{17}$) is enabled.

The output from switches $SW_{16}$ and $SW_{17}$ are connectable to one of the sixteen analog switches $SW_0$ through $SW_{15}$. The sixteen analog switches $SW_0$ through $SW_{15}$ are used to select the desired individual primary electrode (from the row of eight primary electrodes selected by $SW_{16}$ or $SW_{17}$) which will finally receive the input from pin A. Control lines $A_0$, $A_1$, and $A_2$ are used to control the selection of the output from switches $SW_0$ through $SW_{15}$. In the preferred embodiment, during the reading step, the CPU will generate a series of codes along control lines $A_0$ to $A_3$ and $R_{A0}$ to $R_{A2}$ so that each of the individual primary electrodes will be addressed sequentially allowing the resistance of the associated bridge to be determined.

Figure 10:
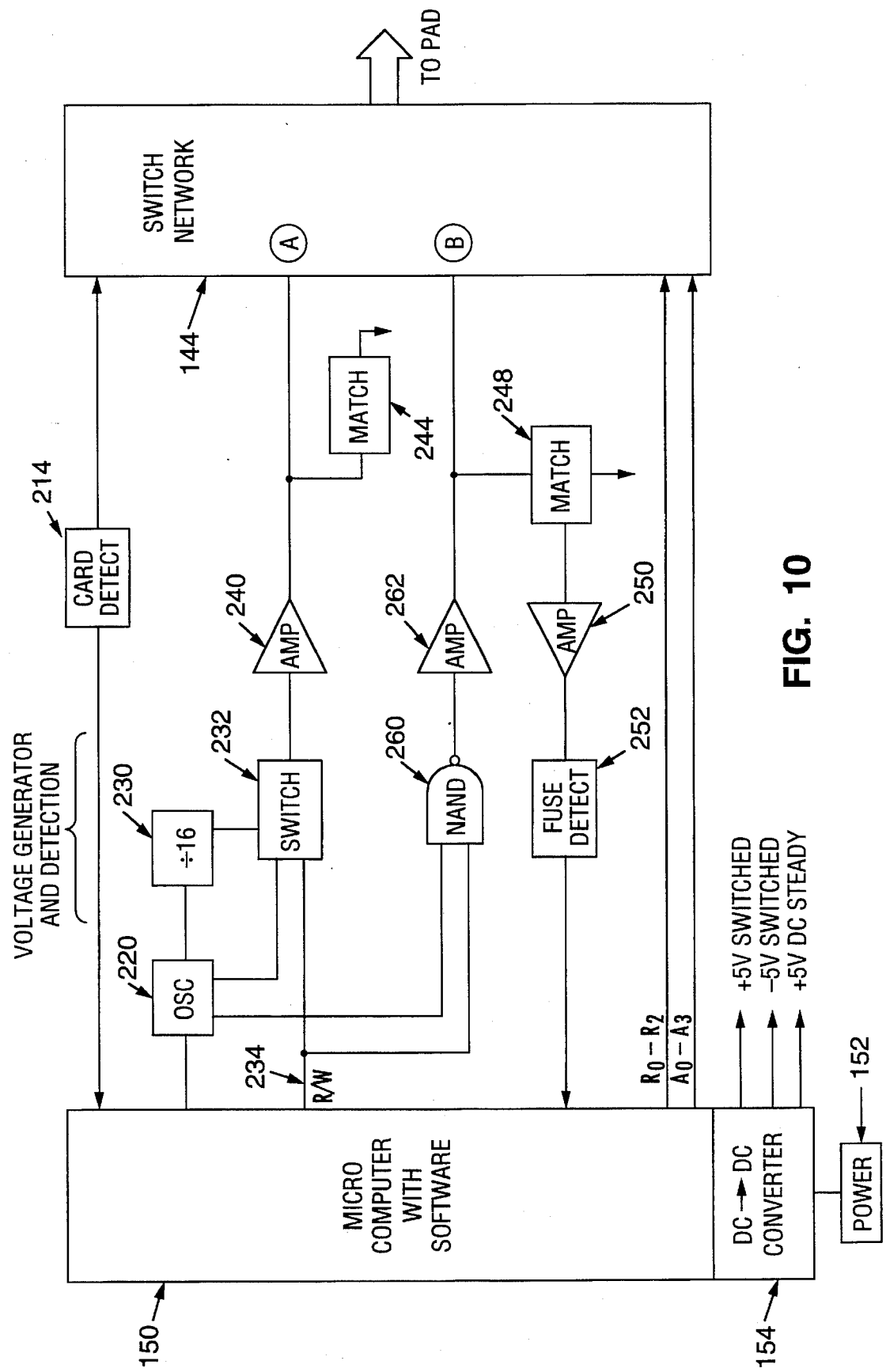
FIG. 10 is a block diagram illustrating a circuit suitable for generating and detecting voltages.

An example of the circuitry which could be used for reading and writing on the data card 130 is illustrated in FIG. 10. The preferred system is controlled by a CPU 150 which can be defined by any suitable microcomputer, such as Mororolla 6811, which has an onboard memory for storing software. The CPU controls the reading and writing through the switching network 144 as discussed above with respect to FIG. 9. As shown in FIG. 10, the control signals for switching network 144 are carried from CPU 150 via buses 210 and 212.

The power supply 152 supplies a voltage for operating the CPU. In the preferred embodiment, supply 152 is defined by a rechargeable, six volt lead-acid battery. The output of supply 152 is delivered to a DC to DC converter 154. Converter 154 generates two switched outputs (+5 and −5 Volts) and a constant DC +5 volts. The two switched outputs are controlled by the CPU and are turned on only during active periods of reading or writing data. The +5 volt DC output is used to power the CPU and the circuitry used to detect the presence of a card at the pad. The card detection circuit must draw a low current since it is always powered. In the preferred embodiment, a card edge detection circuit 214 is provided which relies on the detection of a change in capacitance which occurs when a card is present. A capacitance detection circuit can operated with a power drain of as little as 100 microamps.

Once the presence of a card is detected, a reading operation is commenced. The CPU first turns on the two switched power supplies. The power supply is allowed to stabilize for a period of two milliseconds, after which the oscillator 220 is energized. Oscillator 220 generates an output at 30 MHz. The output of the oscillator is supplied to a frequency divider 230. Preferably, the reduction in frequency is 1/16 to provide an output of about 1.9 MHz. The frequency divided output is supplied to a switch 232. During the reading operation, control line 234 causes switch 232 to supply the divided frequency to an RF amplifier 240. Amplifier 240 takes the logic level of 0 to +5 volts and amplifies it to a 10 volt peak to peak output with a low output impedance.

The output of the amplifier 240 is supplied to input A of the switching network 144. A LC matching network 244 is provided to match the output impedance of the amplifier 240 to the load presented by the switch network 144, at both operating frequencies, when the data card is in position with respect to the pad.

The output pin B of the switching network is passed through a second matching network 248 which is similar to the matching network 244. In addition, matching network 248 includes a transformer (shown in FIG. 4) for generating a voltage which is proportional to the current passing through the electrodes on the pad and in the card. This induced voltage passes through an amplifier 250 and to detector 252. The CPU digitizes the output of detector 252. The voltage measured at detector 252 will be large if the fuse is intact and will be small if the fuse has been blown. By using the CPU to switch the output between each of the primary electrodes (and the associated secondary electrodes) the states of all of the bridges on the card can be measured.

In the preferred embodiment, the RF output voltage varies between +5 volts and −5 volts at pin A. During reading, pin B will remain steady at zero volts to provide a maximum swing of 10 volts. This voltage level supplied at a 1.9 MHz frequency, gives a suitable level of current flow for reading the resistance of the bridges. If it is desired to change the state of a bridge (blow the fuse), both the voltage and the frequency are increased.

When a writing step is to be initiated, control line 234 changes state so that switch 232 will now supply the undivided (30 MHz) output of oscillator 220 to amplifier 240. The higher frequency output functions to reduce the coupling impedance between the pad and card electrode. Control line 234 will also enable a NAND gate 260 and an amplifier 262, both of which were disabled during the read operation. Phase invertor 260 functions so that when pin A is supplied with +5 volts, pin B is supplied with −5 volts (and vice versa), effectively doubling the voltage applied to the terminals of the fuse with the two capacitances in series. Since the voltage is doubled while the frequency is 16 times larger, the current passing through the bridge will be 32 times larger than in the reading step (assuming the capacitive impedence is much greater than the fuse and anlog switch resitances). In the illustrated embodiment, the current through the conductive bridge during a write step would be on the order of five milliamps which exceeds the level necessary to blow the fuse.

After a write step, a read step will be invoked to insure that the fuse was blown. If so, further writing can continue. Using the control lines 210 and 212, the CPU can select which fuse will be blown. This procedure can be performed relatively quickly. In the prototypes tested to date, only 200 milliseconds is needed to address and read all 128 fuses on the card and an additional 20 milliseconds is needed to blow any fuse.

The subject system is particularly desirable in situation where low cost is desirable and high power is not available such as in a parking meter. In this case, the user could purchase a card wherein each bridge could be assigned a specific monetary value. The user could then insert the card in the interface module of the meter and punch in a monetary value corresponding to the length of time he wished to park. The interface module would first read the card to determine if sufficient funds were available. If so, the module would then address a selected number of primary electrodes and blow the number of fuses necessary to equal the chosen payment. Once the fuses were blown, the user could remove the card and use the remaining value for future purchases.

As discussed above, it would be desireable for the user to be able to visually determine the state of the fuses in the card. FIGS. 11 and 12 illustrates two approaches for achieving this goal. FIG. 11 is a cross section of a portion of a card illustrating two electrodes (32, 34) separated by a fuse (36). In this embodiment, the upper dielectric coating 280 used to cover the electrodes is formed with a thermochromic material. This material would be of the type that would change color under conditions of elevated temperature. As can be appreciated, during a writing operation, when high current is passed through the fuse, its temperature will be elevated to a level sufficient to melt the conductive bridge material. This heat can be used to change the color of the coating in the region of the fuse.

FIG. 12 utilizes a similar approach. In this case, a separate reactive coating 282 applied directly over individual fuses. When the fuse is blown, the coating will change color giving the user a visual indication of a change in state.

The type of bridges discussed above are in the form of conventional fuses which are initially conductive (having a low resistance) and can be blown to create a very high resistance. It is within the scope of the subject invention to form the bridge with an "anti-fuse" wherein the material used to connect the primary and secondary electrodes is in the form of a sandwich with a dielectric layer located between two metallic conductive layers. In this case, the bridge will initially have a high resistance. During a write procedure, when the voltage and frequency of the output is high, the output can be used to break down the dielectric, increasing the conduction between the metallic layers. The level of resistance of the bridge would be representative of a defined data state.

The use of either fuses or anti-fuses for the bridge create a write once/read many (WORM) memory. It is also possible to create a memory where the data state can be changed a number of times. This result could be achieved using a material, such as a semiconductor glass, whose resistance can be modified by heating and cooling the material in a defined manner. More specifically, if semiconductor glass material is heated and then rapidly cooled, it presents a high resistance. Conversely, if a semiconductor glass material is cooled slowly after heating, the resistance will be much lower. Using appropriate software for controlling the high voltage, high frequency output supplied to the bridge, the cooling profile experienced at the bridge can be varied during the writing stage. For example, the current could be brought to a peak and then shut off to provide quick cooling and a high resistance. Alternatively, the current could be brought to a peak to heat the bridge and then cycled on an off with the off period gradually increasing to slowly cool the bridge. This slow cooling would result in a lower resistance.

A bridge formed with this material would be read in the same manner as discussed above. The resistive state of the bridge could be repeatedly changed. Semiconductor glasses in the chalconite ($Cu_2S$) family could be used. Materials of this type are used in OVONIC diodes.

In any particular data card, it may be desirable to have bits which can never be changed. For example, the card could have certain fixed bits used for identification. In this case, an extra wide fuse could be used that would not blow during the high output write cycle. On the other hand, the fuse could be omitted so that the state could not be changed. In practice, it is likely that some combination of fixed and changeable bits would be desired.

The preferred embodiment illustrated a card with 128 data bits which could be operated with a 6 volt voltage source. In order to reduce the size of the electrodes and thereby increase the bit density (and assuming the same fusing power is required), the voltage would need to be increased by the square root of the area decreased. Thus, to increase the bit density by a factor of 4, the area of the electrodes would be decreased by 4 and voltage would have to be increased by a factor of 2.

The ultimate bit density is limited by the accuracy attainable in positioning the data card with respect to the pad. Any misalignment between the card and pad (and the respective electrodes) reduces the efficiency of the capacitive coupling. It has been calculated that a misalignment error on the order of 15% of the dimensions of the primary electrodes will reduce the coupling efficiency by 30%, such that 30% less current will be available to blow a fuse. Assuming that a coupling efficiency of 70% is the minimum level required to blow a fuse and the accuracy of positioning of the card with respect to the pad is limited to ±0.25 mm, then the minimum size of the primary electrodes is 1.7×1.7 mm.

While the subject invention has been described with reference to the preferred embodiments, various changes and modifications could be made therein, by one skilled in the art, without varying from the scope and spirit of the subject invention as defined by the appended claims.

I claim:

1. A data storage and information retrieval system comprising:

an interface module, said interface module including;

a plurality of individually addressable primary interface electrodes;

at least one secondary interface electrode, said interface electrodes being arranged in a predetermined pattern;

a data card having changeable bits of information, said card including;

a plurality of primary card electrodes;

at least one secondary card electrode, said card electrodes being arranged in a predetermined pattern selected so that when the card is placed next to the interface module, the interface electrodes will be in register with the card electrodes; and a bridge formed between each primary card electrode and the secondary card electrode, said bridge having a resistance which can be either a first level or a second level, with the level of resistance being representative of a bit of information; and means located in said interface module for generating an alternating current output having two different voltage profiles, said output being applied to selectable interface electrodes in a manner to capacitively couple a current to the opposing card electrodes and wherein the level of resistance of a particular bridge on said card can be evaluated by measuring the amount of current which passes through the bridge when an output having a first voltage profile is applied to the interface electrodes and wherein the resistance of said bridge can be changed by applying an output having a second voltage profile to said interface electrodes and wherein the frequency of said second voltage profile is greater than the frequency of the first voltage profile.

2. A system as recited in claim 1 wherein the voltage of the output associated with the first voltage profile is different from the voltage of the output associated with the second voltage profile.

3. A system as recited in claim 1 wherein the bridge is defined by a fuse and wherein the fuse will be blown when the output having the second voltage profile is passed therethrough such that the resistance of the bridge will be increased.

4. A system as recited in claim 3 wherein the voltage of the output associated with the second voltage profile is higher than the voltage of the output associated with the first voltage profile.

5. A system as recited in claim 1 wherein the bridge includes a dielectric material and wherein the resistance of the bridge will be reduced when the output having the second voltage profile is passed therethrough.

6. A system as recited in claim 5 wherein the voltage of the output associated with the second voltage profile is higher than the voltage of the output associated with the first voltage profile.

7. A system as recited in claim 1 wherein the bridge is formed of a material having a first resistance after the material has been heated and then quickly cooled and a second resistance after the material has been heated and then cooled at a relatively slower rate.

8. A system as recited in claim 7 wherein the output having said second voltage profile has two forms, with the first form including a peak level that is slowly reduced and with the second form having a peak level which is quickly reduced.

9. A system as recited in claim 1 wherein the primary electrodes are formed in a row and a single, elongated secondary electrode is located adjacent the row of primary electrodes.

10. A system as recited in claim 9 wherein the bridges associated with each primary electrode in the row extend over and are connected to the single, common secondary electrode.

11. A system as recited in claim 1 wherein the primary electrodes are formed in two parallel rows and a single, elongated secondary electrode is located between the two rows of primary electrodes and the bridges associated with each primary electrode in the rows extend over and are connected to the single, common secondary electrode.

12. A system as recited in claim 1 further including a visual indicator means associated with each said bridge, said visual indicator means having a first appearance when said bridge has a first resistance level and a second, different appearance when said bridge has a second resistance.

13. A system as recited in claim 12 wherein said visual indicator means is defined by a material which changes color in response to a change in temperature and wherein the temperature of the bridge undergoes a change when the resistance of the bridge is altered.

14. A system as recited in claim 13 wherein said material is defined by a layer overcoating the bridge on said card.

15. A system as recited in claim 1 wherein the frequency of said second voltage profile is at least twice as large as the frequency of said first voltage profile.

16. A system as recited in claim 1 wherein said second voltage profile is further defined by applying said alternating current to both said interface electrodes, in opposite phase, so that the voltage difference across the interface electrodes generated when the second voltage profile is applied is twice the voltage difference generated when the first voltage profile is applied.

17. A system as recited in claim 1 wherein said means for generating an output is powered by a low voltage, low power source.

18. A data storage and information retrieval system comprising:

an interface module, said interface module including;

a plurality of individually addressable primary interface electrodes;

at least one secondary interface electrode, said interface electrodes being arranged in a predetermined pattern;

a data card having changeable bits of information, said card including;

a plurality of primary card electrodes;

at least one secondary card electrode, said card electrodes being arranged in a predetermined pattern selected so that when the card is placed next to the interface module, the interface electrodes will be in register with the card electrodes; and a bridge formed between each primary card electrode and the secondary card electrode, said bridge having a resistance which can be either a first level or a second level, with the level of resistance being representative of a bit of information; and means located in said interface module for generating an output having two different voltage profiles, said output being applied to selectable interface electrodes in a manner to capacitively couple a current to the opposing card electrodes and wherein the level of resistance of a particular bridge on said card can be evaluated by measuring the amount of current which passes through the bridge when an output having a first voltage profile is applied to the interface electrodes and wherein the resistance of said bridge can be changed by applying an output having a second voltage profile to said interface electrodes and wherein said first voltage profile is defined by applying an alternating current to one of said interface electrodes while holding the other interface electrode at ground and wherein said second voltage profile is defined by applying an alternating current to both said interface electrodes, in opposite phase, so that the voltage difference across the interface electrodes generated when the second voltage profile is applied is twice the voltage difference generated when the first voltage profile is applied.

19. A system as recited in claim 18 wherein the frequency of said second voltage profile is greater than the frequency of the first voltage profile.

20. A system as recited in claim 19 wherein the frequency of said second voltage profile is at least twice as large as the frequency of said first voltage profile.

21. A system as recited in claim 18 wherein said means for generating an output is powered by a low voltage, low power source.

22. A system as recited in claim 18 wherein the bridge is defined by a fuse and wherein the fuse will be blown when the output having the second voltage profile is passed therethrough such that the resistance of the bridge will be increased.

23. A system as recited in claim 22 wherein the frequency of said second voltage profile is greater than the frequency of the first voltage profile.

24. A system as recited in claim 18 wherein the bridge includes a dielectric material and wherein the resistance of the bridge will be reduced when the output having the second voltage profile is passed therethrough.

25. A system as recited in claim 24 wherein the frequency of said second voltage profile is greater than the frequency of the first voltage profile.

26. A system as recited in claim 18 wherein the bridge is formed of a material having a first resistance after the material has been heated and then quickly cooled and a second resistance after the material has been heated and then cooled at a relatively slower rate.

27. A system as recited in claim 26 wherein the output having said first voltage profile has a peak level and is slowly reduced and the output current having the second voltage profile has a peak level which is quickly reduced.

28. A system as recited in claim 18 wherein the primary electrodes are formed in a row and a single, elongated secondary electrode is located adjacent the row of primary electrodes.

29. A system as recited in claim 28 wherein the bridges associated with each primary electrode in the row extend over and are connected to the single, common secondary electrode.

30. A system as recited in claim 18 wherein the primary electrodes are formed in two parallel rows and a single, elongated secondary electrode is located between the two rows of primary electrodes and the bridges associated with each primary electrode in the rows extend over and are connected to the single, common secondary electrode.

31. A system as recited in claim 18 further including a visual indicator means associated with each said bridge, said visual indicator means having a first appearance when said bridge has a first resistance level and a second, different appearance when said bridge has a second resistance.

32. A system as recited in claim 31 wherein said visual indicator means is defined by a material which changes color in response to a change in temperature and wherein the temperature of the bridge undergoes a change when the resistance of the bridge is altered.

33. A system as recited in claim 32 wherein said material is defined by a layer overcoating the bridge on said card.

* * * * *